June 4, 1957 — E. P. D'AZZO — 2,794,660
PIPE JOINT ASSEMBLY WITH INTERNAL CLAMPING MEANS
Filed Dec. 20, 1954
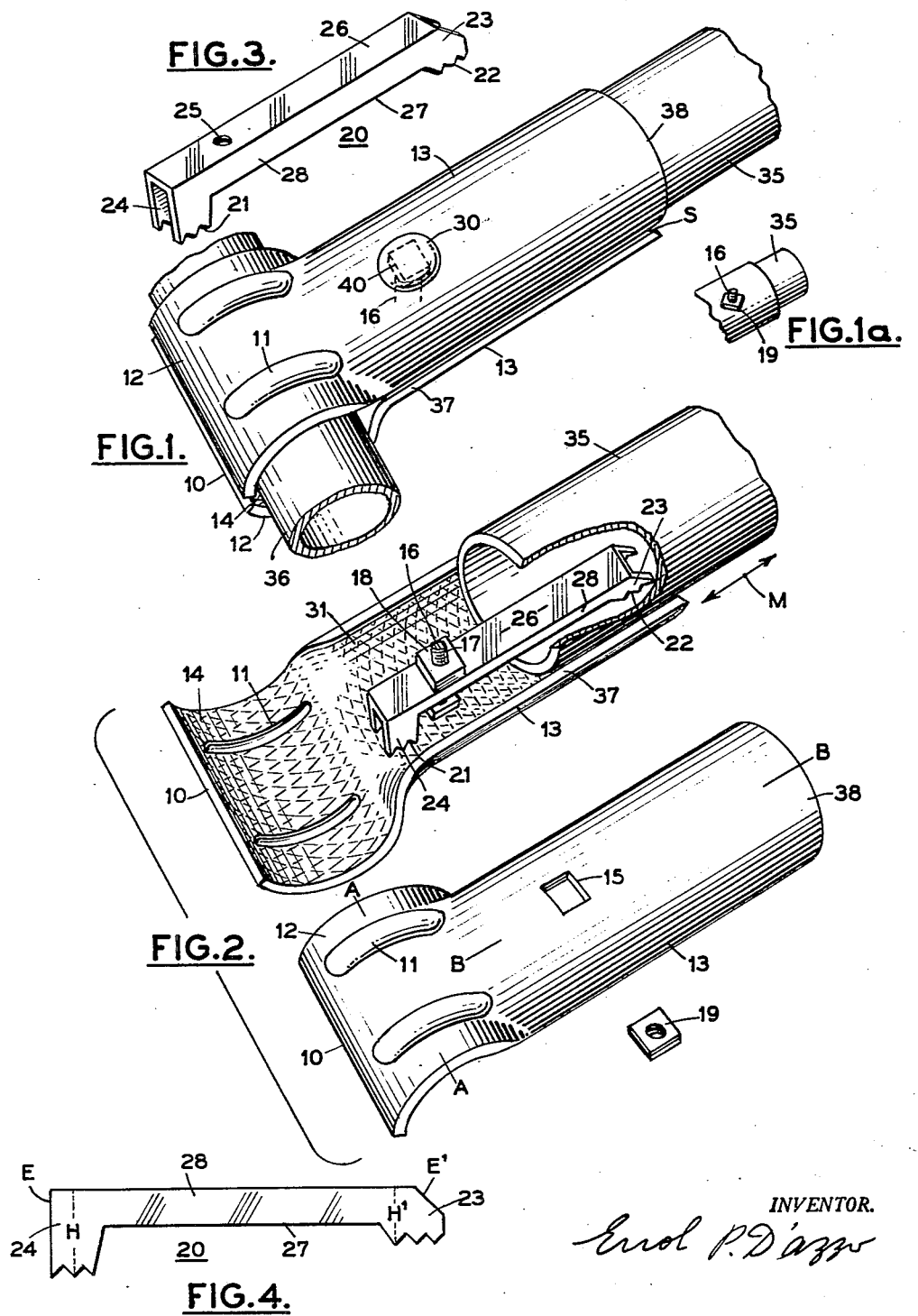
INVENTOR.
Errol P. D'Azzo United States Patent Office 2,794,660
Patented June 4, 1957

2,794,660
PIPE JOINT ASSEMBLY WITH INTERNAL CLAMPING MEANS

Errol P. D'Azzo, New York, N. Y.

Application December 20, 1954, Serial No. 476,233

10 Claims. (Cl. 287—54)

This invention relates to the art of pipe joints and particularly concerns a pipe joint assembly with internal clamping means for securing pipes together in a rigid non-slip connection.

Heretofore pipes such as used for awnings, canopies, dock shelters, fences and the like have been attached together by socket-type joints with no adequate provision for preventing the pipes from slipping or turning in the sockets. When the pipes are joined by the socket means heretofore known the frame structure formed is subject to deformation as the structure is stressed and strained causing the several pipe sections to twist or separate from each other.

The present invention is directed to the problem of providing a pipe joint which cannot be loosened by the stresses and strains encountered in ordinary and even extraordinary use.

It is therefore a principal subject of the invention to provide a pipe joint assembly structure with internal clamping means.

It is a further object to provide a pipe joint assembly including an elongated toothed member for securing a pipe section of a pipe fitting.

Other and further objects and advantages of the invention will become apparent from the following description taken together with the drawing, wherein:

Fig. 1 is a perspective view showing the clamp joint connecting two perpendicularly disposed pipes.

Fig. 2 is an exploded perspective view showing the several parts of the clamp joint.

Fig. 3 is a perspective view of the clamping element.

Fig. 4 is an elevational view of the clamp element.

In the drawings, the clamp joint is shown including a pair of identical fittings or clamping members 10. Each fitting has a generally cylindrical section 13 shaped to conform with the curvature of the exterior side of the hollow cylindrical pipe 35. The section 13 terminates in another cylindrical section 12 having its axis A—A disposed perpendicular to that of the axis B—B of section 13. A square aperture 15 is provided to receive the square section 40 of the bolt 16. A pair of outwardly struck indentations 11 are provided in section 12 to stiffen the section. The inner surface 14 of section 12 is roughened, scored or knurled to provide a frictional gripping surface for pipe 36.

An elongated channel shaped toothed clamping member 20 is employed in the clamp joint. The member is a rigid elongated bar having a substantially rectangular flat top bearing surface 26 and two perpendicularly disposed substantially rectangular sides 28. Each side 28 terminates at both ends in toothed sections or jaws. The jaws 24 have sets of teeth 21 laterally disposed at their free ends. The end E of each jaw 24 is disposed at right angles to the alignment of teeth 21 and top surface 26. The jaws 23 at the other end of the member 20 have sets of teeth 22. Teeth 21 and 22 are disposed beyond the edge 27 of each side 28. Teeth 22 are disposed a lesser distance $H^1$ from the surface 26 than the distance H of teeth 21. Also the upper edge $E^1$ of each jaw 23 is inclined at an acute angle to top 26. An aperture 25 is provided in the top 26 through which bolt 16 can be passed. Teeth 21 and 22 must be offset from side 27 of the member 20 to enable the member to grip the connected pipe 35 effectively. The teeth 22 are located a shorter distance from the side 27 than teeth 22 to enable the jaw 23 to enter a pipe which may have a protruding internal burr, and the offset position of the teeth enable the member to clamp the inside surface of the pipe securely without interference from the burr. The difference between distances H and $H^1$ which represent the respective widths of teeth 21 and 22 must be at least equal to the difference in diameters of the concentric cylindrical exterior and interior sides of pipe 35, for the pipe to be gripped securely by the teeth 22 of member 20. Bolt 16 has thread 17 for receiving and holding nuts 18, 19. The bolt has a round head 30 and a square adjoining section 40 of lesser area which fits into aperture 15 in section 13.

In Fig. 2 is shown the clamp joint as it appears partly assembled. The bolt 16 extends through fitting 10 and member 20 and is secured by nut 18. Before nut 18 is tightened the pipe section 35 is movable relative to fitting 10 and vice versa as shown by arrow M to adjust the lengths of the concave portions of fitting sections 13 which extend beyond the end of the pipe 35. The jaws 23 easily fit into the opening in pipe 35. Even if the opening is very small jaws 23 will fit into the opening of the pipe. The aperture 25 in the member 20 is located just beyond jaws 24 to allow a sufficient range of axial adjustment of pipe 35 and to insure firm engagement of teeth 21, 22 with the fitting and the pipe interior respectively. The inner concave surface 31 of the fitting is roughened, scored or knurled to provide a better gripping surface for engagement by teeth 21. When nut 18 is fully tightened the pipe 35 and fitting 10 are locked together, with fitting section 13 and pipe 35 in axial alignment, and member 20 disposed substantially parallel to the aligned axes of the pipe and fitting section. Another pipe 36 may then be placed in section 12 of the fitting and the second fitting section 10 placed over it as shown in Figs. 1 and 1a with the concave sides of fitting sections 13 facing each other. Nut 19 is tightened on thread 17 of bolt 16 to clamp the pipe 36 and serves an additional clamping means for pipe 35. The scored inner surface 14 of the sections 12 causes the pipe 36 to be held with adequate force. Bolt 16 passes through the registering apertures 15, 25 of sections 13 and member 20.

If pipe 36 is horizontally disposed the pipe 35 can be disposed vertically above or below pipe 36, and its position will be maintained with respect to pipe 36 because of the very effective internal clamping provided by toothed member 20.

A particularly important feature of the invention is that the fittings are quickly mountable and dismountable by means of a conventional nut wrench. The fittings will accommodate various sizes of pipes since increasing the sizes of pipes joined will only increase spaces S between the flat edges 37 of sections 13 and a corresponding space between the edges of sections 12. It will be noted that ends 38 of the fittings overlap the end of pipe 35 by a considerable distance so that effective engagement is made between the pipe and the several sections 13 of the fittings.

Although only a single embodiment of the invention has been disclosed this has been done by way of illustration only and the invention is not to be construed as limited thereto. Many changes are possible as will readily occur to those skilled in the art. What is claimed and desired to protect by Letters Patent of the United States is:

1. A pipe joint assembly, comprising a pair of axially aligned fittings having generally cylindrical sections, an elongated channel shaped member disposed within said sections and substantially parallel to the aligned axes thereof, said member having a pair of toothed jaws at each end, a threaded bolt extending through registering apertures in said fittings and said member, and a pair of nuts threaded on said bolt with one of the nuts bearing on the member and the other nut bearing on a fitting.

2. A pipe joint assembly according to claim 1, wherein the width of the jaws at one end of the member is substantially less than the width of the jaws at the other end, and wherein the aperture in the member is located just beyond the jaws at said other end.

3. In a pipe joint assembly, an integral clamping element comprising an elongated channel shaped member having a flat top and perpendicularly disposed sides with a jaw disposed at each end of each side, each jaw having a set of aligned teeth with the alignment of teeth substantially parallel to the flat top of the member, there being an aperture in the flat top.

4. In a pipe joint assembly, an elongated member having generally rectangular sides including jaws at opposite ends thereof, each jaw having a plurality of teeth, the teeth on each jaw being offset from said sides with teeth at one end of the member being further offset from said side than teeth at the other end.

5. A pipe joint assembly, comprising a hollow pipe having cylindrical exterior and interior sides, a cylindrical fitting section juxtaposed with the exterior side of the pipe, said fitting section having a portion extending beyond the pipe in axial alignment therewith and an elongated clamping member, said member being disposed substantially parallel to the axis of the pipe and having one end disposed in and engaging the interior side of the pipe and having another end secured to the portion of the fitting section extending axially beyond the pipe.

6. A pipe joint assembly for a hollow cylindrical pipe, comprising a pair of axially aligned cylindrical fitting sections, said sections having concave sides facing each other, an elongated clamping member disposed between the fitting sections, said sections and member having registering apertures, and a threaded member passing through said apertures and securing the fitting sections and clamping member together, said clamping member having teeth at one end thereof facing one of the concave sides of one of said fitting sections for securing said pipe therebetween.

7. A pipe joint assembly for a hollow cylindrical pipe, comprising a cylindrical fitting section having a concave side, an elongated clamping member having sets of teeth at opposite ends thereof, said fitting section and member having registering apertures, and a threaded member passing through said apertures and securing the fitting section and clamping member together with one of said sets of teeth engaging said concave side, and another of said sets of teeth facing said concave side to secure said pipe therebetween.

8. A pipe joint assembly comprising a hollow pipe having cylindrical exterior and interior sides, a cylindrical fitting section having a concave side juxtaposed to one side of said pipe, an elongated clamping member having sets of teeth at opposite ends of a rectangular side thereof, one of said sets of teeth being wider than another set by at least the difference in diameter betwen said exterior and interior sides, said fitting section and said member having registering apertures, and a threaded member passing through said apertures and securing the fitting section and clamping member together, with said one set of teeth engaging said concave side and said other set of teeth facing the concave side and engaging a portion of said pipe therebetween.

9. A pipe joint clamping means, comprising an elongated member having a substantially rectangular top and a rectangular side, said top having an aperture therein, said side having sets of teeth at opposite ends thereof, each of said sets of teeth being wider than said lateral side.

10. A pipe joint clamping means, comprising a channel shaped elongated member having a substantially rectangular top and rectangular sides, said top having an aperture therein, said sides having laterally disposed sets of teeth at opposite ends thereof, each of said sets of teeth at one of said ends being wider than the sets of teeth at the other of said ends, and all of said sets of teeth being wider than said sides.

References Cited in the file of this patent

UNITED STATES PATENTS

| | | |
|---|---|---|
| 743,964 | Weir | Nov. 10, 1903 |
| 1,052,200 | Adams | Feb. 4, 1913 |

FOREIGN PATENTS

| | | |
|---|---|---|
| 398,600 | Great Britain | Sept. 21, 1933 |